(12) United States Patent
Uno et al.

(10) Patent No.: US 10,829,601 B2
(45) Date of Patent: Nov. 10, 2020

(54) PROCESS FOR PRODUCING POLYMER FILM

(71) Applicant: KANEKA CORPORATION, Osaka (JP)

(72) Inventors: Takashi Uno, Settsu (JP); Koji Hanada, Otsu (JP); Hayato Niki, Otsu (JP)

(73) Assignee: KANEKA CORPORATION, Osaka-shi (JP)

( * ) Notice: Subject to any disclaimer, the term of this patent is extended or adjusted under 35 U.S.C. 154(b) by 328 days.

(21) Appl. No.: 15/736,616

(22) PCT Filed: Jun. 17, 2016

(86) PCT No.: PCT/JP2016/068153
§ 371 (c)(1),
(2) Date: Dec. 14, 2017

(87) PCT Pub. No.: WO2016/204285
PCT Pub. Date: Dec. 22, 2016

(65) Prior Publication Data
US 2018/0171085 A1 Jun. 21, 2018

(30) Foreign Application Priority Data
Jun. 18, 2015 (JP) .................. 2015-123045

(51) Int. Cl.
*C08J 5/18* (2006.01)
*B29C 41/24* (2006.01)
(Continued)

(52) U.S. Cl.
CPC ............. *C08J 5/18* (2013.01); *B29C 41/24* (2013.01); *B29C 41/46* (2013.01); *B29C 55/02* (2013.01);
(Continued)

(58) Field of Classification Search
CPC ..... C08J 5/18; C08J 2379/08; C08G 73/1071; C08G 73/1042; C08G 73/105;
(Continued)

(56) References Cited

U.S. PATENT DOCUMENTS

2009/0146340 A1 6/2009 Tanimura
2014/0093715 A1* 4/2014 Fujii .................. C08G 73/1042
428/220

FOREIGN PATENT DOCUMENTS

JP 11-286025 A 10/1999
JP 2007-160704 A 6/2007
(Continued)

OTHER PUBLICATIONS

International Search Report dated Sep. 6, 2016 in PCT/JP2016/068153, citing documents AA, AO, AP, AQ, AR, AS and AT therein, 2 pages.

(Continued)

*Primary Examiner* — Xiao S Zhao
*Assistant Examiner* — Ninh V Le
(74) *Attorney, Agent, or Firm* — Oblon, McClelland, Maier & Neustadt, L.L.P.

(57) ABSTRACT

The present invention provides a process for producing a polymer film at high productivity: during a process for drying gripped portions of both edges of a gel film, a first heat treatment is performed by blowing hot air in the film width direction and a second heat treatment is performed by blowing hot air at gripped portions of both edges of the gel film in a direction parallel to the film running direction.

20 Claims, 2 Drawing Sheets

(51) Int. Cl.
  *B29C 41/46* (2006.01)
  *C08G 73/10* (2006.01)
  *C09D 179/08* (2006.01)
  *B29C 55/02* (2006.01)
  *C08L 79/08* (2006.01)

(52) U.S. Cl.
  CPC ....... *C08G 73/105* (2013.01); *C08G 73/1042* (2013.01); *C08G 73/1071* (2013.01); *C08L 79/08* (2013.01); *C09D 179/08* (2013.01); *C08J 2379/08* (2013.01); *C08L 2203/16* (2013.01)

(58) Field of Classification Search
  CPC ... C09D 179/08; C08L 79/08; C08L 2203/16; B29C 41/24; B29C 41/46; B29C 55/02; B29C 35/02; B29C 41/28; B29C 55/20; B29C 55/14; B29C 55/08; B29B 13/02; B29B 13/023; B29B 13/026; B29D 7/01
  See application file for complete search history.

(56) References Cited

FOREIGN PATENT DOCUMENTS

| | | | |
|---|---|---|---|
| JP | 2007-290345 | A | 11/2007 |
| JP | 2010-82992 | A | 4/2010 |
| JP | 2010082992 | A * | 4/2010 |
| JP | 5784192 | B1 * | 9/2015 |
| KR | 20110061489 | A * | 6/2011 |
| WO | WO 2010/095317 | A1 | 8/2010 |
| WO | WO 2013/018341 | A1 | 2/2013 |

OTHER PUBLICATIONS

International Preliminary Report on Patentability and Written Opinion dated Dec. 19, 2017 in in PCT/JP2016/068153, citing documents AP, AQ and AR therein, 9 pages.

* cited by examiner

PROCESS FOR PRODUCING POLYMER FILM

TECHNICAL FIELD

The present invention relates to a process for producing a polymer film that contributes to enhancing the productivity of a polymer film (such as a polyimide film).

BACKGROUND ART

Various processes are available for producing polymer films. For example, when using a thermoplastic polymer having a high softening temperature or having softening and decomposing temperatures close to each other, a process for producing a polymer film that includes steps (i)~(iii) below is available:
(i) preparing a polymer solution by dissolving a thermoplastic polymer in a solvent to make a polymer solution or by employing a state of solution formed by the solvent that was used in reactions such as polymerization for making higher-molecular weight molecules;
(ii) flow-casting the polymer solution on a support body and molding it into a film, followed by heating and drying the film-shaped polymer solution on the support body, so as to obtain a self-supporting semi-dry gel film; and
(iii) peeling the gel film from the support body, gripping both edges of the gel film with gripping members, heating the gel film by transporting it through a heating oven so as to finish heating and drying the gel film, and releasing the gel film from the grip at both edges. Accordingly, a polymer film is produced.

For producing a film using a substance such as a polyimide that is insoluble in a solvent, it is an option to form a solution by dissolving a precursor of the substance in a solvent, to which a curing agent is added if applicable, so that a polymer film is formed by the aforementioned process, while a conversion reaction, for example, an imidization reaction, is progressed at the same time as the film is heated.

As described above, when a film is heated and dried in a heating oven, a process conducted as follows is known, for example: setting nozzles with wide slits or multiple holes in the width direction of a film (hereinafter may also be referred to as a direction TD) at constant intervals while also setting the nozzles in the running direction of a film (hereinafter may also be referred to as a direction MD) at constant intervals so that hot air is uniformly blown from above and below the film in the film width direction. However, such a process has problems; for example, the ambient temperature near the gripped portions at both edges of a film tends to be lowered because of heat loss stemming from metallic gripping members such as clips and pins and because of the influence from outside air; progress in the heating and drying process is slower in the gripped portions than in the center portion of the film because gripping members themselves block hot air; and the like. Accordingly, to increase the heating temperature at both edges of a film, a production process is proposed such as applying heat intensively only on the gripped portions of the film at a higher temperature than the rest of the film in the heating oven (for example, see Patent Literatures 1 and 2).

CITATION LIST

Patent Literature

Patent Literature 1: JP2007-160704A (published Jun. 28, 2007)
Patent Literature 2: WO2013/018341 (published Feb. 7, 2013)

SUMMARY OF THE INVENTION

Problems to be Solved by the Invention

However, since the aforementioned process has problems in productivity, for example, extra equipment required to secure a new heat source, an increase in the running cost or the like, further improvements are yet to be made from a technical point of view.

The present invention was carried out in consideration of the above problems. Its objective is to provide a polymer film production process capable of enhancing productivity.

Solutions to the Problems

The inventors of the present invention have carried out intensive studies in consideration of the aforementioned problems and found that when both edges of a self-supporting gel film are further dried in a process for producing a polymer film, the above-identified problems are solved by performing a first heat treatment through hot air uniformly blown in the width direction of the gel film, and by performing a second heat treatment through hot air continuously blown at both edges of the gel film in a direction parallel to the running direction of the gripped portions of the gel film. Accordingly, the present invention has been completed.

Namely, the present invention is a process for producing a polymer film characterized by including the following steps:
(1) a step for preparing a polymer solution, a solution of a precursor of the polymer, or a solution containing the polymer precursor solution and a curing agent;
(2) a step for forming a gel film by flow-casting the solution on a support body to mold it into a film, which is then heated, and by peeling the gel film from the support body; and
(3) a step for further heating the gel film by gripping both edges of the gel film in the film width direction.

In the above step (3), a first heat treatment is performed by uniformly blowing hot air in the film width direction of the gel film while performing a second heat treatment by continuously blowing hot air in a direction parallel to the running direction of the gel film at both edge portions gripped in the film width direction of the gel film.

Effects of the Invention

The production process related to the present invention is effective in enhancing the productivity of polymer films.

DETAILED DESCRIPTION OF THE EMBODIMENTS

Figure 1:
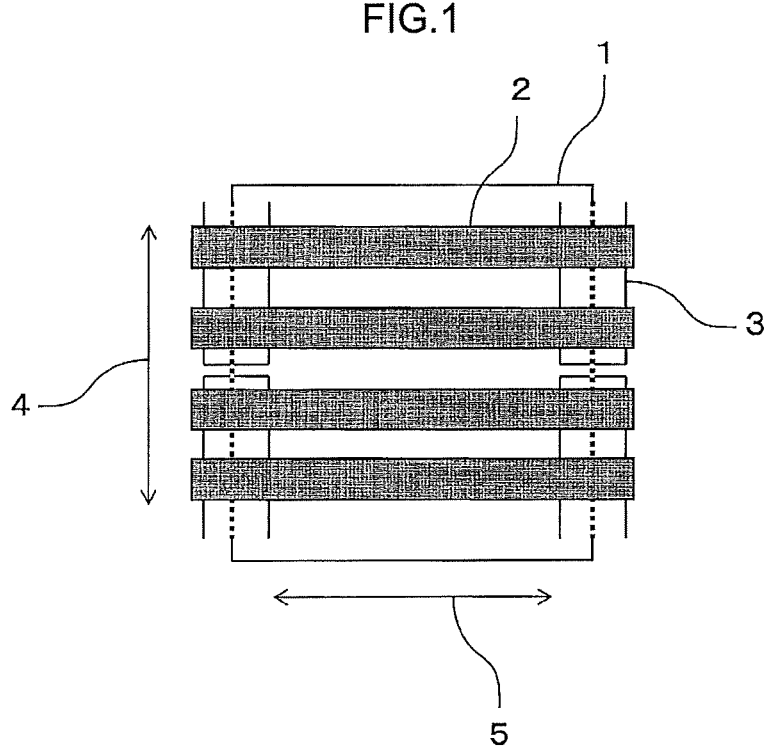
FIG. 1 is an example of a top view schematically showing a heating oven including first heat treatment sections and second heat treatment sections used in an embodiment of the present invention.

An embodiment of the present invention is described below; however, the present invention is not limited to the embodiment. The present invention is not limited to the structures described below, and various modifications are possible within a scope specified in patent claims. Moreover, when technical procedures disclosed in different embodiments and examples are appropriately combined, resultant embodiments and examples are also included in the technical scope of the present invention. In addition, the entire contents of patent literatures cited in the present application are incorporated herein by reference.

In the present application, "A to B" indicating the range of values means "at least (A) (including (A) and greater than (A)), but no greater than (B) (including (B) and less than (B))" unless otherwise indicated.

(1. Process for Producing Polymer Film)

As long as a process entails the steps characterized as follows, the rest of the process for producing a polymer film according to an embodiment of the present invention is not limited to any specific procedures, materials, conditions or facilities:

(1) a step for preparing a polymer solution, a solution of a precursor of the polymer, or a solution containing the polymer precursor solution and a curing agent;
(2) a step for forming a gel film by flow-casting the solution on a support body to mold it into a film, which is then heated, and by peeling the gel film from the support body; and
(3) a step for further heating the gel film by gripping both edges of the gel film in the film width direction.

In the above step (3), a first heat treatment is performed by uniformly blowing hot air in the film width direction of the gel film while performing a second heat treatment by continuously blowing hot air in a direction parallel to the running direction of the gel film at both edge portions gripped in the film width direction of the gel film.

The process for producing a polymer film related to the present invention is effective in enhancing the productivity of a polymer film because of the above steps (1)~(3). More specifically, the process for producing a polymer film related to the present invention is capable of suppressing a decrease in the ambient temperature near the gripped portions by continuously performing heat treatment on the gripped portions at both edges of a gel film in a direction parallel to the running direction of the film. Accordingly, the process is effective in heating and drying both edges of the gel film in a short period of time. Moreover, when the process related to the present invention is employed for producing a polymer film, there is no risk of scratching that may occur near the gripped portions caused when the film flaps, nor is it necessary to intentionally raise the temperature in the heating oven during heat treatment related to the present invention. Accordingly, heating and drying the gripped portions of the film are efficiently performed without causing concern over film quality. Furthermore, using the process for producing a polymer film related to the present invention gives the ability to increase the speed of transporting film without extending the length of a heating oven, or to make the length of a heating oven shorter than that of a conventional oven even when the transporting speed is at a conventional rate. Therefore, the present invention is effective in providing a polymer film production process that achieves high productivity.

The following provides a detailed description of each step in a production process of a polymer film according to the present embodiment.

(2. Step (1))

As long as the present process for producing a polymer film includes a step (1) for preparing a polymer solution, a solution of a precursor of the polymer, or a solution containing the polymer precursor solution and a curing agent, the rest of the procedures are not limited specifically.

In the present embodiment, a polymer or a polymer precursor provided as a polymer solution is not limited to any specific type; examples are polyimides such as polyimide, polyamide-imide, polyetherimide and polyester imide; heterocyclic ring-containing aromatic polymers such as polybenzimidazole and polyphenylene benzobisoxazole; aramids; aromatic liquid crystal polymers; and the like.

As for the process for producing a polymer film according to the present embodiment, it is preferred to use a solution of polyamic acid, which is a polyimide precursor, more preferably, to use a solution containing a polyamic acid solution and a curing agent. As an embodiment of the present invention, a process is described below in detail using the aforementioned solution containing a polyamic acid as the polyimide precursor and a curing agent. However, the present invention is not limited to an example that uses a solution containing a polyamic acid as the polyimide precursor and a curing agent.

<Polyamic Acid>

A polyamic acid is usually produced by dissolving an aromatic diamine and an aromatic dianhydride at substantially equimolar amounts in an organic solvent, and by stirring the resultant solution under a controlled temperature until the polymerization of the aromatic anhydride and aromatic diamine is completed. The polyamic acid solution containing a polyamic acid is usually obtained at a concentration of 5 wt. % to 35 wt. %, preferably at 10 wt. % to 30 wt. %. When the concentration is in such a range, the polyamic acid solution has an appropriate molecular weight and solution viscosity.

As for the polymerization process of a polyamic acid, any of known processes or a combination thereof may be employed. A process for polymerizing a polyamic acid is characterized by the structures of an aromatic diamine and aromatic dianhydride as the raw material monomers, the ratio of amounts of raw material monomers, and the order of adding the raw material monomers and the like. Especially, by controlling the order of monomers to be added, the structure and various physical properties of the resulting polyimide are controllable. More specifically, depending on the order of raw material monomers to be added, polyimides having a sequence structure (block structure) may be obtained.

Examples of the aforementioned aromatic diamine are, but are not limited to, 3,3'-diaminodiphenyl ether, 3,4'-diaminodiphenyl ether, 4,4'-diaminodiphenyl ether, 2,2-bis{4-(4-aminophenoxy)phenyl}propane, 2,2-bis{4-(4-aminophenoxy)phenyl}hexafluoropropane, bis{4-(3-aminophenoxy)phenyl}sulfone, bis{4-(4-aminophenoxy)phenyl}sulfone, 1,3-bis(3-aminophenoxy)benzene, 1,3-bis(4-aminophenoxy)benzene, 1,4-bis(4-aminophenoxy)benzene, 3,3'-diaminobenzophenone, 4,4'-diaminobenzophenone, 3,3'-dichlorobenzidine, 3,3'-dimethylbenzidine, 2,2'-dimethylbenzidine, 3,3'-dimethoxy benzidine, 2,2'-dimethoxy benzidine, 1,4-diaminobenzene (p-phenylenediamine), 1,3-diaminobenzene(m-phenylenediamine), 4,4'-diaminodiphenylsulfone, 3,3'-diaminodiphenylsulfone, 9,9-bis(4-aminophenyl)fluorene, 4,4'-(1,4-phenylene bis(1-methylethylidene))bisaniline, 4,4'-(1,3-phenylene bis(1-methylethylidene))bisaniline, 4,4'-diaminobenzanilide, and the like. Those listed above may also be used in combination thereof.

Examples of the aforementioned aromatic dianhydride are, but are not limited to, aromatic tetracarboxylic dianhydrides such as 3,3',4,4'-benzophenone tetracarboxylic dianhydride, 2,2',3,3'-benzophenone tetracarboxylic dianhydride, 4,4'-oxydiphthalic dianhydride, 3,4'-oxyphthalic dianhydride, ethylenebis(trimellitic monoester anhydride), bisphenol-A bis(trimellitic monoester anhydride), pyromellitic dianhydride, 2,3,6,7-naphthalene tetracarboxylic dianhydride, 1,4,5,8-naphthalene tetracarboxylic dianhydride, 3,3',4,4'-diphenylsulfone tetracarboxylic dianhydride, 3,3',4,4'-dimethyl diphenylsilane tetracarboxylic dianhydride, 3,3',4,4'-tetraphenylsilane tetracarboxylic dianhydride, 1,2,3,4-furan tetracarboxylic dianhydride, 4,4'-bis(3,4-dicarboxyphenoxy)diphenylpropane dianhydride, 4,4'-hexafluoroisopropylidene diphthalic anhydride, 3,3',4,4'-biphenyl tetracarboxylic dianhydride, 2,3,3',4'-biphenyl tetracarboxylic dianhydride, p-phenylene bis(trimellitic monoester anhydride), and p-phenylene diphthalic anhydride. Those listed above may also be used in combination thereof.

Regarding the above aromatic diamine and aromatic dianhydride, the order of adding them or the combination of monomers and compositions is not limited particularly as long as they are reacted at substantially equimolar amounts.

An organic solvent used as the polymerization solvent for producing a polyamic acid is not limited particularly as long as it dissolves an aromatic diamine component, aromatic dianhydride component and the resultant polyamic acid. When N,N-dimethylformamide, N,N-diethylformamide, N,N-dimethylacetamide, N-methyl-2-pyrrolidone or the like is used as the polymerization solvent, the obtained organic solvent solution of a polyamic acid (polyamic acid solution) is used as is when a polymer solution is prepared.

The reaction temperature for producing a polyamic acid is preferred to be −10° C. to 50° C. It is preferred to carry out a reaction by controlling the temperature in such a range, since the reaction progresses under an excellent reaction rate, and the productivity is excellent. The reaction time is not limited particularly, and it is usually a few minutes to a few hours.

<Curing Agent>

In the present embodiment, a curing agent is defined as that which contains at least either a dehydrating agent or a catalyst.

Here, a dehydrating agent is not limited to any particular type as long as it is capable of dehydrating a polyamic acid through ring-closing dehydration reactions. Examples are aliphatic anhydrides, aromatic anhydrides, N,N'-dialkyl carbodiimide, lower aliphatic halides, halogenated lower aliphatic acid anhydride, arylsulfonic acid dihalides, thionyl halides, and the like. They may be used alone or in combination thereof. Among them, it is especially preferred to use an aliphatic anhydride or an aromatic anhydride.

A catalyst is not limited to any specific component as long as it is capable of facilitating the ring-closing dehydration reactions of a dehydrating agent on a polyamic acid. Specific examples are aliphatic tertiary amines, aromatic tertiary amines, heterocyclic tertiary amines and the like.

By using a dehydrating agent or a catalyst listed above, a gelation reaction progresses appropriately when the above polymer solution is made into a liquid film and dried.

<Additives that May be Used in Polymer Solution>

A polymer solution used in the present embodiment may contain various additives if applicable.

The additives are not limited specifically, but may include organic and inorganic pigments, insoluble additives such as fillers, organic and inorganic pigments, heat stabilizers, antioxidants, ultraviolet absorbents, antistatic agents, flame retardants, pigments, dyes, fatty acid esters, organic lubricants (such as waxes) and the like.

<Process for Preparing Polymer Solution>

It is not limited to any specific process for preparing a polymer solution containing a polyamic acid and a curing agent or a polymer solution containing a polyamic acid, additives and a curing agent, as long as a process is capable of sufficiently dispersing or dissolving a curing agent and additives, if applicable, in a polyamic acid solution.

It is not limited to any specific timing, either, for adding a curing agent and additives, if applicable (hereinafter may also be referred to as "curing agent and others"), to a polyamic acid solution. Examples of timing for adding each of a curing agent and additives, if applicable, are during polymerization reactions to form a polyamic acid, after a polyamic acid is polymerized, and shortly before a polymer solution is formed into a liquid film on a support body. An appropriate timing is selected in consideration of dispersibility of each component.

Moreover, it is not limited to any specific process for adding a curing agent and insoluble additives, if applicable, in a polyamic acid solution; it is an option to select an optimal process from among a process for adding them directly to the solution, a process for dispersing or dissolving them in an organic solvent, which is then added to the solution, and the like.

To add a curing agent and if applicable, additives, it is preferred to prepare a solution of the curing agent or a solution of the curing agent and additives, if applicable, by dispersing or dissolving them in advance in the same organic solvent that is used for forming a polyamic acid solution, and then to add the prepared solution to the polyamic acid solution for forming a mixture. Since the viscosity of a polyamic acid solution is high, using the above process makes it easier to disperse or dissolve the curing agent and others in the polyamic acid solution than to add them directly to the solution. Moreover, since a curing agent and the like may be handled virtually the same as a liquid, it is easier to add the curing agent and the like to a solution.

(3. Step (2))

To produce a polymer film according to the present embodiment, it is sufficient if the process includes a step (2) for flow-casting on a support body a polymer solution, a solution of a precursor of the polymer, or a solution containing the polymer precursor solution and a curing agent so as to mold the solution into a film, which is then subjected to heat treatment for forming a gel film, followed by a process for peeling the gel film from the support body. The step (2) for forming a gel film may also be referred to as a film-forming step.

As for the process for the film-forming step, namely, the process for molding a polymer solution or a polymer precursor solution into a film, it is not limited to any specific process; for example, a die-casting process or the following using various coaters may be used: (i) a polymer solution or a polymer precursor solution is formed into a liquid film on a support body such as an endless belt or a drum while controlling its thickness, and the liquid film on the support body is heated and dried until the film becomes self-supporting so as to obtain a gel film having self-supporting properties; (ii) the self-supporting gel film is peeled from the support body, and both edge portions of the gel film in a width direction are fixed when the gel film is transported and passed through a heating oven so that the film is made into its final state.

An example of a preferred step for forming a film is described below in detail.

<Film-Forming Step>

In a step for forming a polyimide film, the polymer solution is extruded from dies to be cast on a support body and formed into a liquid film, which is then further heated and dried for forming a gel film. Namely, in the present film-forming step, by heating and drying the liquid film made of the cast polymer solution, an imidization progresses to a certain degree while the solvent in the liquid film is evaporated so as to express self-supporting properties. Accordingly, a self-supporting gel film is obtained. The gel film is in a semi-dry state and contains the solvent that was included in the liquid film, that is, a volatile component is contained.

The amount of residual volatile component in a gel film, the degree of imidization, and the temperature of a heating oven may be selected appropriately based on the type of polyamic acid, the thickness of the obtained polyimide film and the like. In other words, the process and conditions for forming a gel film are not limited specifically as long as they are formed into a gel film by evaporating some of the solvent from the liquid film or by imidizing part of the polyamic acid. Usually, a drying process such as heating is employed. In such a process, the gel film on a support body is preferred to be heated and dried in a temperature range of 60° C. to 200° C., more preferably 80° C. to 150° C. By so setting, a step for forming a gel film is preferably progressed, and the amount of residual volatile component is effectively reduced at an initial stage of the drying process. A heating process is not limited particularly, and any known heating process may be preferably employed.

Note that "residual volatile component" (may also be referred to as "residual volatile substance") in the present application refers to, among the solvent components in a polymer solution, a solvent component remaining in a gel film.

Moreover, the heating and drying duration is not limited particularly, and it is preferred to be 1 second to 600 seconds. When the heating and drying duration is within such a range, a gel film is efficiently produced.

The structure of dies used in the present embodiment is not limited particularly, and various known structures are preferably used. It may be a single-layer die or multilayer die having two or more layers.

The support body used in the present step is not limited particularly. Considering the step for continuously producing a polyimide film, a rotating drum, endless belt or the like may be used preferably. Moreover, the material of the support body is not limited to any particular type, and metals and resins may be employed. For example, from the viewpoint of heat resistance, metals such as stainless steel are more preferred, and especially preferred are a stainless-steel drum, stainless-steel endless belt or the like. For example, the present step may be preferably conducted by casting the polymer solution on a heated support body in a heating oven. When casting is conducted on a heated support body, it is effective in reducing heating time and drying time.

In the present embodiment, the film width direction indicates the direction perpendicular to the film-forming direction of a liquid film that is continuously cast. When the liquid film becomes a gel film and polyimide film, the width direction corresponds to the direction perpendicular to the film-forming direction of the gel film and polyimide film. Furthermore, in the present embodiment, a film running direction indicates the film-forming direction of a liquid film that is continuously cast.

Here, an edge portion of the liquid film in the film width direction refers to a predetermined width that includes either of both edge portions in the film width direction. It is sufficient if an edge portion includes the region to be fixed when the film is heated in a heating oven. The width of each edge portion on both edge portions is preferred to be 10 mm to 200 mm, more preferably 20 mm to 190 mm, even more preferably 30 mm to 180 mm, especially preferably 40 mm to 170 mm. A width of at least 10 mm of each edge portion is enough to secure the film for the heating process in a heating oven. When the width of each edge portion is no greater than 200 mm, yield of a finished product is enhanced and the finished product is efficiently produced. Here, "finished product" refers to a polymer film produced by the polymer film production process related to the present invention. Hereinafter, the same definition applies to the term "finished product."

The width of each edge portion on either side may be the same or different, but it is preferred to be approximately the same.

The center portion of a liquid film in the film width direction refers to the portion excluding the edge portions in the width direction of a liquid film. The thickness is preferred to be constant in the entire center portion. When the thickness of the entire center portion is constant, the finished product shows excellent quality without any variations, difference in thickness or the like, thereby achieving advantages such as an increased yield of finished product.

The entire width of a liquid film is set appropriate to the width of a film to be produced; it is usually 500 mm to 3000 mm.

A process for producing a single-layer polyimide film was described above. However, the production process related to the present embodiment is not limited to producing a single-layer polyimide film, and is also employed preferably for producing a multilayer polyimide film. In such a case, conventional production procedures of a multilayer film may be appropriately selected and used accordingly.

Moreover, when using the process for producing a polymer film according to the present embodiment, the obtained polyimide film is not limited to any particular type; it may be a film of a thermoplastic polyimide, a non-thermoplastic polyimide, or a copolymer of those polyimides.

(4. Step (3))

The polymer film production process of the present embodiment includes a step (3) for gripping both edge portions in the film width direction of a gel film obtained in the above step (2) and performing heat treatment on the gel film; in the step (3), a first heat treatment is performed by uniformly blowing hot air in the film width direction of the gel film and performing a second heat treatment by continuously blowing hot air in a direction parallel to the film running direction of the gel film at both edge portions gripped in the film width direction of the gel film. As long as step (3) includes the above treatments, the rest of the procedures are not limited particularly.

In the present step, since the gel film is heated and dried by hot air, the present step may also be referred to as a heating step and a drying step. Moreover, "heating step" and "drying step" may also be referred to as "heating and drying step."

<Gripping Both End Portions of Gel Film in Width Direction>

The gel film obtained in the above step (2) (film-forming step) is fixed at both edges by gripping members and heated in a heating oven. Namely, in the present heating and drying step, the gel film obtained in the film-forming step is passed through a heating oven by being fixed at both edge portions in the film width direction so that the residual solvent is removed while imidization is completed. Accordingly a polyimide film is obtained.

Here, gripping members used in the present embodiment are not limited to any specific type, and conventionally known gripping members may be used. For example, it is preferred to use gripping members such as clips, chucks and tenter pins to fix gel film at both of its edge portions in the film width direction and to transport the gel film through a heating oven.

Figure 2:
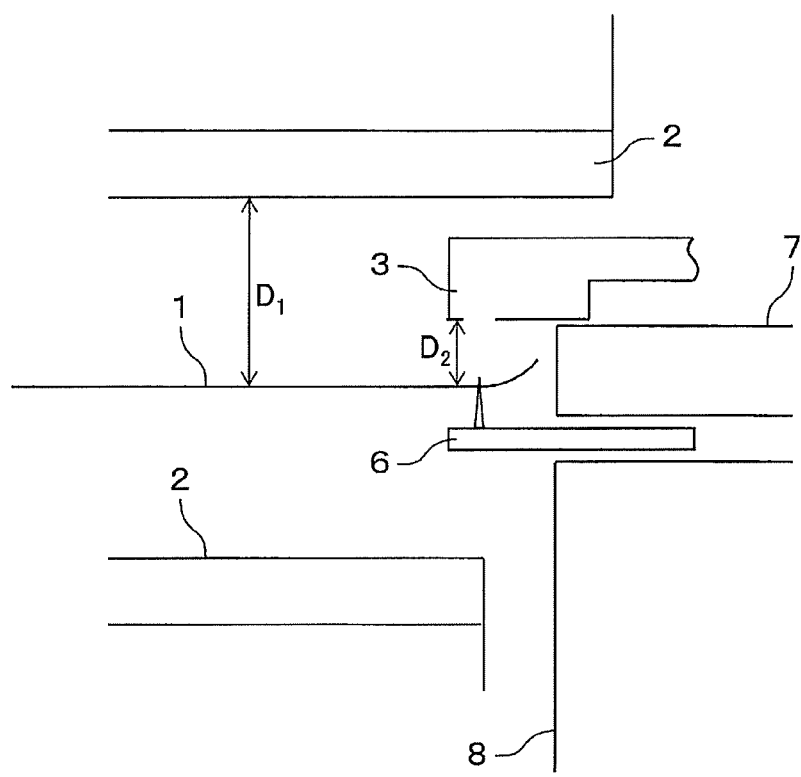
FIG. 2 is an example of a front view schematically showing a heating oven including first heat treatment sections and second heat treatment sections used in an embodiment of the present invention.

More specifically, as shown in FIG. 2, for example, it is preferred to fix both edge portions of gel film 1 peeled from the support body by piercing the edge portions with needle-like fixing members, called tenter pins 6, positioned to be sandwiched by transport device cover 7 and bracket 8. The fixed gel film 1 is supported as it is spread out, and is transported into a heating oven to be heated and dried. When heating gel film 1 is finished and the film is completely imidized, a polyimide film is obtained. Then, the polyimide film is pulled out of tenter pins 6 and collected accordingly. For the fixing process, fixing members other than tenter pins 6, for example, clips, chucks or the like, may also be used.

In the present embodiment, a heating oven for the heating and drying process is not limited to any specific type, and a tenter oven, for example, may also be used.

In the present embodiment, heating and drying time (also, the retention time in the heating oven) in the step for the heating and drying process (heating and drying step) is not limited particularly. Time for calcining the film may be set within a conventional time frame as long as it is enough for completing imidization. For example, the time is preferred to be set at 1 second to 600 seconds.

The entire width of a polyimide film obtained by the heating and drying step is set appropriate to the usage purposes or the like of the produced film. It is usually 500 mm to 3000 mm.

In addition, the thickness in the center portion in the film width direction of a polyimide film obtained in the heating and drying step is set appropriate to the usage purposes or the like of the produced film; it is usually 3 µm to 125 µm, and having a constant thickness is preferred. The advantage coming from a constant thickness in the entire center portion is the same as that when the center portion thickness of a liquid film in the film width direction is constant. When the center portion thickness of the polyimide film in the film width direction is 3 µm or greater, it is advantageous for obtaining a finished product that is less likely to break, whereas when the center portion thickness of the polyimide film in the film width direction is 125 µm or less, it is advantageous for reducing the heating and drying time of the gel film in step (3), namely, it is advantageous for achieving excellent productivity of the finished product.

Here, the center portion of a polyimide film obtained by a heating and drying process corresponds to the center portion of the above liquid film in the film width direction. Both edge portions of a polyimide film obtained in the heating and drying process correspond to edge portions of the above liquid film in the film width direction.

Moreover, a polyimide film obtained in the heating and drying process is preferred to have a greater thickness at the edge portions in the film width direction than the thickness of the center portion in the film width direction. When the thickness of both edge portions in the film width direction is set greater than that of the center portion in the width direction, it is advantageous for preventing tears in the film at the gripped portions. The thickness of both edge portions of a polyimide film is preferred to be 1.0 to 4 times, more preferably 1.1 to 3 times, even more preferably 1.2 to 2 times, the thickness of the center portion.

The step (3) of the present embodiment is characterized in that a first heat treatment is performed by uniformly blowing hot air in the film width direction of a gel film while performing a second heat treatment by continuously blowing hot air in a direction parallel to the film running direction of the gel film at both edge portions gripped in the film width direction of the gel film. The following are descriptions of the first heat treatment and second heat treatment performed in the heating and drying process of the present embodiment.

<First Heat Treatment>

The first heat treatment of the present embodiment is conducted by uniformly applying heat on a gel film in its width direction.

To obtain a polyimide film by heating the entire film center portion while both edge portions in the film width direction of a gel film are gripped, it is not limited to any specific process as long as the gel film is heated effectively so as to be calcined into a polyimide film. For a first heat treatment section, heat-ray radiators, hot air blowers, infrared heaters and the like may be used. Considering explosion/fire prevention and running cost, a hot air blower is especially preferable.

The specific structure of a hot air blower is not limited particularly; to efficiently reduce the amount of residual volatile component, it is preferred to have such a device capable of uniformly jet-spraying hot air in the entire width direction of a gel film from both the upper and lower surfaces of the gel film. Alternatively, depending on the limitations or purpose of the facility layout, it is also an option to use such a device that is capable of jet-spraying hot air uniformly in the entire film width direction of a gel film from the upper surface or from the lower surface of the gel film. For example, nozzles having long jet-spray slits or multiple jet-spray holes arranged in the film width direction of a gel film may be positioned at constant intervals in a direction perpendicular to the film running direction of the gel film.

As shown in FIG. 1 and FIG. 2, an example of a first heat treatment of the present embodiment is conducted in first heat treatment sections 2 by uniformly blowing hot air in film width direction 5 of gel film 1 from the upper and lower surfaces of gel film 1 with both of its edge portions in the film width direction 5 being gripped by tenter pins 6. First heat treatment sections 2 are positioned at constant intervals in a direction perpendicular to film running direction 4 of gel film 1.

The velocity of hot air in the first heat treatment is not limited particularly, and may be set appropriate to heating conditions and transportability of a gel film. Usually, the air velocity is 0.5 m/sec to 30 m/sec. To enhance productivity and yield of finished products, it is preferred to be 1 m/sec to 25 m/sec, more preferably 5 m/sec to 20 m/sec.

Temperature $T_1$ (° C.) in the first heat treatment refers to the temperature of hot air in the first heat treatment. The temperature $T_1$ (° C.) in the first heat treatment is not limited particularly as long as it is in the temperature range at which imidization is completed and the amount of residual volatile component contained in the gel film is sufficiently reduced. Considering productivity and prevention of deterioration caused by heat, 200° C. to 600° C. is preferred, more preferably 250° C. to 500° C. In addition, the hot air temperature is preferred to gradually increase as the process progresses.

Moreover, in the first heat treatment of the present embodiment, distance $D_1$ from a first heat treatment section to a gel film is not limited particularly, and may be set appropriate to heating conditions and the transportability of a gel film. It is usually approximately 30 mm to 300 mm. Considering efficiency in the heating and drying process and stable transportation of a gel film, the distance is more preferred to be 50 mm to 250 mm, even more preferably 100 mm to 200 mm.

As shown in FIG. 2, distance $D_1$ from a first heat treatment section to a gel film indicates the shortest distance from first heat treatment section 2 to gel film 1.

<Second Heat Treatment>

While performing a first heat treatment, the present embodiment is also characterized by a second heat treatment performed by continuously blowing hot air parallel to the film running direction of the gel film at both edge portions gripped as described above in the film width direction of the gel film.

As for a second heat treatment section in the present embodiment to apply heat on both edge portions in the film width direction of a gel film, it is not limited particularly as long as the second heat treatment is performed by the second heat treatment section disposed parallel to the film running direction of a gel film so that heat is continuously applied on both edge portions in the film width direction of the gel film. As for a second heat treatment section of the present embodiment, any conventional devices with a heating function such as a hot air blower and infrared heater may be used. Considering explosion/fire prevention and running cost, it is especially preferred to employ a hot air blower.

As shown in FIG. 2, second heat treatment section 3 of the present embodiment is positioned to be sandwiched between first heat treatment section 2 and transport device cover 7, while being disposed to be parallel to film running direction 4 of gel film 1 as shown in FIG. 1.

The heat source of a hot air blower to apply heat on both edge portions in the film width direction of a gel film is not limited particularly as long as the temperature and air volume necessary for heating and drying a gel film are secured. Examples of a heat source of a hot air blower are hot air generators such as electric heaters, heat exchangers that use high-temperature air, and the like. When a hot air blower is used for a second heat treatment section of the present embodiment, the specific structure of a heating device is not limited particularly for continuously heating both edge portions in the film width direction of a gel film, and various conventionally known structures may be preferably used. For example, long jet-spray slits or multiple jet-spray holes disposed in the film running direction of a gel film may be employed. Such structures may be set appropriate to the velocity and amount of air, or to the available space in the facility or the like.

In the second heat treatment, the position of a second heat treatment section is set appropriate to the gripping process and size of gripping members. When a hot air blower is used for the second heat treatment section of the present embodiment, the angle of the second heat treatment section relative to a gel film is not limited particularly as long as the jet-spray direction of hot air faces the gripped portions of a gel film and the angle is set appropriate to the facility space or the like. Hot air may be blown from above or below a gel film or from both above and below a gel film. For example, if tenter pins are used, to efficiently heat and dry the film, the second heat treatment section is preferred to be positioned above both edge portions in the film width direction 5 of gel film 1 as shown in FIGS. 1 and 2. Moreover, to efficiently heat and dry the film, second heat treatment sections 3 are preferred to be continuously disposed so that no gap is formed in film running direction 4 of gel film 1.

The velocity of hot air in the second heat treatment is not limited particularly, and may be set appropriate to heating conditions and the transportability of a gel film. Usually, it is approximately 1 m/sec to 20 m/sec. From the viewpoint of enhancing the productivity and yield of a polymer film as the final product, it is more preferred to be 3 m/sec to 15 m/sec, even more preferably 5 m/sec to 10 m/sec. If the velocity of hot air in the second heat treatment is 1 m/sec or faster, it is advantageous for reducing heating and drying time; and if the velocity of hot air in the second heat treatment is 20 m/sec or lower, it is advantageous for preventing tears in the final product.

Temperature $T_2$ (° C.) in the second heat treatment refers to the ambient temperature near a second heat treatment section. Temperature $T_2$ (° C.) in the second heat treatment is easily determined by measuring the temperature near the outlet for blowing hot air from the second heat treatment section. Temperature $T_2$ (° C.) for the second heat treatment is not limited particularly as long as it is in a temperature range sufficient to reduce the amount of residual volatile component from both edge portions in the film width direction of a gel film. Considering the productivity and prevention of deterioration of finished products caused by heat, it is preferred to be 200° C. to 600° C., more preferably 250° C. to 500° C. In addition, the hot air temperature is preferred to be gradually increased as the process progresses.

In the present embodiment, temperature $T_1$ (° C.) for the first heat treatment and temperature $T_2$ (° C.) for the second heat treatment are preferred to be in such a relationship that temperature $T_1$ (° C.) for the first heat treatment is set higher than temperature $T_2$ (° C.) for the second heat treatment. $(T_1-T_2)$, represented by temperature $T_1$ (° C.) of the first heat treatment and temperature $T_2$ (° C.) of the second heat treatment, is preferred to be 0.1° C. to 30° C., more preferably 0.1° C. to 20° C., especially preferably 0.1° C. to 16° C. In such a temperature range, the amount of residual volatile component is sufficiently reduced from both edge portions of a gel film.

In the second heat treatment, distance $D_2$ from a second heat treatment section to a gel film is not limited particularly, and may be set appropriate to heating conditions and the transportability of a gel film. It is usually 3 mm to 100 mm. Considering heating and drying efficiency and stable transportation of a gel film, it is more preferred to be 5 mm to 50 mm, more preferably 10 mm to 30 mm.

Distance $D_2$ from a second heat treatment section to a gel film indicates the shortest distance from first heat treatment section 3 to gel film 1 as shown in FIG. 2.

Distance $D_2$ from a second heat treatment section to a gel film when performing a second heat treatment is preferred to be shorter than distance $D_1$ from a first heat treatment section to the gel film for performing a first heat treatment, but that is not the only option. The relationship of distance $D_1$ and distance $D_2$ may be represented by a formula $D_2/D_1$, for example, and is preferred to be $D_2/D_1<1$.

The main purpose of the second heat treatment of the present embodiment is to remove a volatile component contained in a gel film from both edge portions in the film width direction of the gel film gripped by gripping members such as tenter pins. The amount of residual volatile component contained in a gel film after step (3) of the present embodiment is referred to as "amount (%) of residual volatile component." The process for measuring the amount (%) of residual volatile component and its definition are described later in detail in the examples. The amount (%) of residual volatile component in both film edges of a gel film related to the present embodiment is preferred to be 12% or lower, more preferably 10% or lower, even more preferably 8% or lower, especially preferably 7% or lower, from the viewpoint of drying efficiency. Moreover, the lower limit of the amount (%) of residual volatile component is not particularly limited, and it is preferred to be in a range that prevents tearing or breaking of finished products.

In step (3) of the present embodiment, terms "first" and "second" used in first and second heat treatments are used only to show there are two types of heat treatment. The terms do not indicate degrees of importance of both heat treatments or the order of performing the heat treatments.

In step (3) of the present embodiment, the order of performing the first heat treatment and the second heat treatment is not limited particularly; it is an option to perform the second heat treatment after the first heat treatment, or to perform the first and second heat treatments simultaneously.

When a heating and drying time (sec) is set as (X) from the first heat treatment through the second heat treatment in step (3) of the present embodiment, and the amount (%) of residual volatile component contained in the gel film after the step (3) is set as (Y), the polymer film production process related to the present embodiment is preferred to satisfy formula (1) below considering cost performance, productivity and yield of finished products.

$$Y < 0.0283X^2 - 1.715X + 32.467 \quad (1)$$

The effects such as cost performance, productivity and yield of the polymer film production process according to the present embodiment may also be expressed by the removal efficiency of the residual volatile component defined by formula (2) using (X) and (Y) above.

Removal efficiency of residual volatile component $$= (0.0283X^2 - 1.715X + 32.467) - Y \quad (2)$$

The removal efficiency of the residual volatile component in the present embodiment is not limited specifically. Considering cost performance, productivity and yield of finished products, it is preferred to be greater than zero, more preferably greater than 0.5, even more preferably greater than 1.0, further more preferably greater than 2.0, especially preferably greater than 3.0. The upper limit of the removal efficiency of the residual volatile component is not limited particularly, but it is preferred to be set in a range that prevents tears or scratches in finished products.

The present invention may also be structured as follows.
[1] A process for producing a polymer film, including steps below:
(1) a step for preparing a polymer solution, a solution of a precursor of the polymer, or a solution containing the polymer precursor solution and a curing agent;
(2) a step for forming a gel film by flow-casting the solution on a support body to mold it into a film, which is then heated, and by peeling the gel film from the support body; and
(3) a step for further heat treating the gel film by gripping both edges of the gel film in the film width direction.

In the above step (3), a first heat treatment is performed by uniformly blowing hot air in the film width direction of the gel film while performing a second heat treatment by continuously blowing hot air in a direction parallel to the running direction of the gel film at both edge portions of the gel film gripped in the film width direction.
[2] The process for producing a polymer film according to [1], characterized in that $(T_1-T_2)$, represented by temperature $T_1$ (° C.) for the first heat treatment and temperature $T_2$ (° C.) for the second heat treatment, is set to be 0.1 to 30.
[3] The process for producing a polymer film according to [1] or [2], characterized in that when distance $D_1$ is set between the gel film and a first heat treatment section for performing the first heat treatment, and distance $D_2$ is set between the gel film and a second heat treatment section for performing the second heat treatment, $D_2/D_1$ is set to be 0.30 or less.
[4] The process for producing a polymer film according to any of [1] to [3], characterized in that the polymer film is a polyimide film.
[5] The process for producing a polymer film according to any of [1] to [4], characterized in that when the heating and drying time (sec) is set as (X) from the first heat treatment through the second heat treatment, and the amount (%) of residual volatile component contained in the gel film after the step (3) is set as (Y), formula (1) below is satisfied.

$$Y < 0.0283X^2 - 1.715X + 32.467 \quad (1)$$

EXAMPLES

An embodiment of the present invention is described below in further detail by referring to examples. However, the present invention is not limited to the examples.
(Amount of Residual Volatile Component at Both Edge Portions in Film Width Direction of Film)

To measure the amount of residual volatile component at both edge portions in the film width direction of a film, a film coming out of a heating oven was cut out from the outer side of a pin closest to the center portion in the film width direction to have a length of 200 mm in the running direction of the film. After the cut-out film was weighed, the film was dried at 450° C. for 20 minutes using a high constant-temperature chamber STPH-101, made by Espec Corporation. The film was weighed again after being dried. Also, the film thickness was measured after the film was dried. The amount of residual volatile component related to the present invention is defined by formula (3) below.

$$\text{Amount (\%) of residual volatile component} = ((W - W_0) \times 100 / W_0) \times (Tc/Te) \quad (3)$$

In the above formula (3), (W) is the film weight before drying, ($W_0$) is the film weight after drying, (Tc) is the thickness (μm) of the center portion of the dried film and (Te) is the thickness (μm) of the edge portions of the dried film.
(Scratches on Film)

After a film has come out of the heating oven, the film was visually observed to determine the presence of scratches on the film.
(Tears in Film)

After a film has come out of the heating oven, the film was visually observed to determine the presence of tears in the film.

Synthesis Example 1

In N,N-dimethylformamide (DMF), pyromellitic dianhydride, 4,4'-diaminodiphenyl ether and p-phenylenediamine were set to have a molar ratio of 4/3/1 and were polymerized. Accordingly, a polyamic acid solution, which is a solution of a precursor of the polymer, was obtained.

Production Example 1

A curing agent made of acetic anhydride as an aliphatic anhydride, isoquinoline as a heterocyclic tertiary amine, and DMF was mixed into the polyamic acid solution obtained in Synthesis Example 1 so as to form a solution containing a polymer precursor solution and a curing agent. The mixture was continuously extruded through T-dies and coated on a stainless-steel endless belt.

Example 1

A solution containing a polymer precursor solution and a curing agent, namely, the solution made of a polyamic acid and a curing agent coated in Production Example 1, was heated and dried at 110° C. for 75 seconds, and a self-supporting gel film was obtained accordingly. The gel film was peeled from the endless belt, and both of its edge portions in the film width direction of the gel film were gripped with tenter pins. First and second heat treatments were performed while the film was being transported through a tenter oven to heat and dry the gel film. As a result, a 12.5 µm-thick polyimide film was obtained. In the present example, temperature $T_1$ in the first heat treatment was set at 275° C. and the air velocity in the second heat treatment was 10 m/sec. During that time, temperature $T_2$ was 259° C. The first and second heat treatments were conducted simultaneously, and the time for heating and drying the gel film in both heat treatments was 25 seconds. The amount of residual volatile component at both edge portions in the film width direction of the obtained film was 7.0 wt. %, and the removal efficiency of the residual volatile component was 0.28. Operating conditions and results are shown in Table 1.

Comparative Example 1

A solution containing a polymer precursor solution and a curing agent, namely, the solution made of a polyamic acid and a curing agent coated in Production Example 1, was heated and dried at 110° C. for 75 seconds. Accordingly, a self-supporting gel film was obtained. The gel film was peeled from the endless belt, and both of its edge portions in the film width direction of the gel film were gripped with tenter pins. Then, only the first heat treatment was performed while the film was being transported through the tenter oven to heat and dry the gel film. As a result, a 12.5 µm-thick polyimide film was obtained. In the present Comparative Example, temperature $T_1$ in the first heat treatment was set at 275° C. and the second heat treatment was not conducted. The time for heating and drying the gel film in the first heat treatment was 25 seconds. The amount of residual volatile component at both edge portions in the film width direction of the obtained film was 7.7 wt. %, and the removal efficiency of the residual volatile component was −0.42. Operating conditions and results are shown in Table 1. In Comparative Example 1, the temperature of the second heat treatment refers to the ambient temperature measured at the same spot where the temperature in the second heat treatment was measured in Example 1.

Example 2

A solution containing a polymer precursor solution and a curing agent, namely, the solution made of a polyamic acid and a curing agent coated in Production Example 1, was heated and dried at 120° C. for 60 seconds. Accordingly, a self-supporting gel film was obtained. The gel film was peeled from the endless belt, and both of its edge portions in the film width direction of the gel film were gripped with tenter pins. First and second heat treatments were performed while the film was being transported through the tenter oven to heat and dry the gel film. As a result, a 12.5 µm-thick polyimide film was obtained. In the present example, temperature $T_1$ in the first heat treatment was set at 275° C. and the air velocity in the second heat treatment was 10 m/sec. During that time, temperature $T_2$ was 259° C. The first and second heat treatments were conducted simultaneously, and the heating and drying time of the gel film for both heat treatments was 20 seconds. The amount of residual volatile component at both edge portions in the film width direction of the obtained film was 8.8 wt. %, and the removal efficiency of the residual volatile component was 0.69. Operating conditions and results are shown in Table 1.

Comparative Example 2

A solution containing a polymer precursor solution and a curing agent, namely, the solution made of a polyamic acid and a curing agent coated in Production Example 1, was heated and dried at 120° C. for 60 seconds and a self-supporting gel film was obtained accordingly. After the gel film was peeled from the endless belt, both of its edge portions in the film width direction of the gel film were gripped with tenter pins. Then, only the first heat treatment was performed while the film was being transported through the tenter oven to heat and dry the gel film. As a result, a 12.5 µm-thick polyimide film was obtained. In the present Comparative Example, temperature $T_1$ in the first heat treatment was set at 275° C. and the second heat treatment was not conducted. The time for heating and drying the gel film in the first heat treatment was 20 seconds. The amount of residual volatile component at both edge portions in the film width direction of the obtained film was 10.2 wt. %, and the removal efficiency of the residual volatile component was −0.71. Operating conditions and the results are shown in Table 1. In Comparative Example 2, the temperature of the second heat treatment refers to the ambient temperature measured at the same spot where the temperature in the second heat treatment was measured in Example 1.

Example 3

A solution containing a polymer precursor solution and a curing agent, namely, the solution made of a polyamic acid and a curing agent coated in Production Example 1, was heated and dried at 130° C. for 50 seconds. Accordingly, a self-supporting gel film was obtained. After the gel film was peeled from the endless belt, both of its edge portions in the film width direction of the gel film were gripped with tenter pins. First and second heat treatments were performed while the film was being transported through the tenter oven to heat and dry the gel film. As a result, a 12.5 µm-thick polyimide film was obtained. In the present example, temperature $T_1$ in the first heat treatment was set at 275° C. and the air velocity in the second heat treatment was 10 m/sec. During that time, temperature $T_2$ was 259° C. The first and second heat treatments were conducted simultaneously, and the heating and drying time of the gel film for both heat treatments was 17 seconds. The amount of residual volatile component at both edge portions in the film width direction of the obtained film was 10.3 wt. %, and the removal efficiency of the residual volatile component was 1.19. Operating conditions and results are shown in Table 1.

Comparative Example 3

A solution containing a polymer precursor solution and a curing agent, namely, the solution made of a polyamic acid and a curing agent coated in Production Example 1, was heated and dried at 130° C. for 50 seconds and a self-supporting gel film was obtained accordingly. After the gel film was peeled from the endless belt, both of its edge portions in the film width direction of the gel film were gripped with tenter pins. Then, only the first heat treatment was performed while the film was being transported through the tenter oven to heat and dry the gel film. As a result, a 12.5 μm-thick polyimide film was obtained. In the present Comparative Example, temperature $T_1$ in the first heat treatment was set at 275° C. and the second heat treatment was not conducted. The time for heating and drying the gel film in the first heat treatment was 17 seconds. The amount of residual volatile component at both edge portions in the film width direction of the obtained film was 12.3 wt. %, and the removal efficiency of the residual volatile component was −0.81. Operating conditions and the results are shown in Table 1. In Comparative Example 3, the temperature of the second heat treatment refers to the ambient temperature measured at the same spot where the temperature in the second heat treatment was measured in Example 1.

Example 4

A solution containing a polymer precursor solution and a curing agent, namely, the solution made of a polyamic acid and a curing agent coated in Production Example 1, was heated and dried at 110° C. for 75 seconds. Accordingly, a self-supporting gel film was obtained. After the gel film was peeled from the endless belt, both of its edge portions in the film width direction of the gel film were gripped with tenter pins. First and second heat treatments were performed while the film was being transported through the tenter oven to heat and dry the gel film. As a result, a 12.5 μm-thick polyimide film was obtained. In the present example, temperature $T_1$ in the first heat treatment was set at 300° C. and the air velocity in the second heat treatment was 10 m/sec. During that time, temperature $T_2$ was 286° C. The first and second heat treatments were conducted simultaneously, and the heating and drying time of the gel film for both heat treatments was 25 seconds. The amount of residual volatile component at both edge portions in the film width direction of the obtained film was 6.4 wt. %, and the removal efficiency of the residual volatile component was 0.88. Operating conditions and results are shown in Table 1.

Example 5

A solution containing a polymer precursor solution and a curing agent, namely, the solution made of a polyamic acid and a curing agent coated in Production Example 1, was heated and dried at 120° C. for 60 seconds. Accordingly, a self-supporting gel film was obtained. After the gel film was peeled from the endless belt, both of its edge portions in the film width direction of the gel film were gripped with tenter pins. First and second heat treatments were performed while the film was being transported through the tenter oven to heat and dry the gel film. As a result, a 12.5 μm-thick polyimide film was obtained. In the present example, temperature $T_1$ in the first heat treatment was set at 300° C. and the air velocity in the second heat treatment was 10 m/sec. During that time, temperature $T_2$ was 286° C. The first and second heat treatments were conducted simultaneously, and the heating and drying time of the gel film for both heat treatments was 20 seconds. The amount of residual volatile component at both edge portions in the film width direction of the obtained film was 7.4 wt. %, and the removal efficiency of the residual volatile component was 2.09. Operating conditions and results are shown in Table 1.

Example 6

A solution containing a polymer precursor solution and a curing agent, namely, the solution made of a polyamic acid and a curing agent coated in Production Example 1, was heated and dried at 130° C. for 50 seconds. Accordingly, a self-supporting gel film was obtained. After the gel film was peeled from the endless belt, both of its edge portions in the film width direction of the gel film were gripped with tenter pins. First and second heat treatments were performed while the film was being transported through the tenter oven to heat and dry the gel film. As a result, a 12.5 μm-thick polyimide film was obtained. In the present example, temperature $T_1$ in the first heat treatment was set at 300° C. and the air velocity in the second heat treatment was 10 m/sec. During that time, temperature $T_2$ was 286° C. The first and second heat treatments were conducted simultaneously, and the heating and drying time of the gel film for both heat treatments was 17 seconds. The amount of residual volatile component at both edge portions in the film width direction of the obtained film was 8.2 wt. %, and the removal efficiency of the residual volatile component was 3.29. Operating conditions and results are shown in Table 1.

Example 7

A solution containing a polymer precursor solution and a curing agent, namely, the solution made of a polyamic acid and a curing agent coated in Production Example 1, was heated and dried at 130° C. for 50 seconds. Accordingly, a self-supporting gel film was obtained. After the gel film was peeled from the endless belt, both of its edge portions in the film width direction of the gel film were gripped with tenter pins. First and second heat treatments were performed while the film was being transported through the tenter oven to heat and dry the gel film. As a result, a 12.5 μm-thick polyimide film was obtained. In the present example, temperature $T_1$ in the first heat treatment was set at 300° C. and the air velocity in the second heat treatment was 8 m/sec. During that time, temperature $T_2$ was 286° C. The first and second heat treatments were conducted simultaneously, and the heating and drying time of the gel film for both heat treatments was 17 seconds. The amount of residual volatile component at both edge portions in the film width direction of the obtained film was 10.6 wt. %, and the removal efficiency of the residual volatile component was 0.89. Operating conditions and results are shown in Table 1.

Example 8

A solution containing a polymer precursor solution and a curing agent, namely, the solution made of a polyamic acid and a curing agent coated in Production Example 1, was heated and dried at 130° C. for 50 seconds. Accordingly, a self-supporting gel film was obtained. After the gel film was peeled from the endless belt, both of its edge portions in the film width direction of the gel film were gripped with tenter pins. First and second heat treatments were performed while the film was being transported through the tenter oven to heat and dry the gel film. As a result, a 12.5 μm-thick polyimide film was obtained. In the present example, temperature $T_1$ in the first heat treatment was set at 300° C. and the air velocity in the second heat treatment was 6 m/sec. During that time, temperature $T_2$ was 286° C. The first and second heat treatments were conducted simultaneously, and the heating and drying time of the gel film for both heat treatments was 17 seconds. The amount of residual volatile component at both edge portions in the film width direction of the obtained film was 11.3 wt. %, and the removal efficiency of the residual volatile component was 0.19. Operating conditions and results are shown in Table 1.

Example 9

A solution containing a polymer precursor solution and a curing agent, namely, the solution made of a polyamic acid solution and a curing agent coated in Production Example 1, was heated and dried at 130° C. for 50 seconds. Accordingly, a self-supporting gel film was obtained. After the gel film was peeled from the endless belt, both of its edge portions in the film width direction of the gel film were gripped with tenter pins. First and second heat treatments were performed while the film was being transported through the tenter oven to heat and dry the gel film. As a result, a 12.5 μm-thick polyimide film was obtained. In the present example, temperature $T_1$ in the first heat treatment was set at 300° C. and the air velocity in the second heat treatment was 11 m/sec. During that time, temperature $T_2$ was 286° C. The first and second heat treatments were conducted simultaneously, and the time for heating and drying the gel film in both heat treatments was 17 seconds. The amount of residual volatile component at both edge portions in the film width direction of the obtained film was 6.0 wt. %, and the removal efficiency of the residual volatile component was 5.48. Operating conditions and results are shown in Table 1.

Comparative Example 4

A solution containing a polymer precursor solution and a curing agent, namely, the solution made of a polyamic acid solution and a curing agent coated in Production Example 1, was heated and dried at 120° C. for 60 seconds and a self-supporting gel film was obtained accordingly. After the gel film was peeled from the endless belt, both of its edge portions in the film width direction of the gel film were gripped with tenter pins. Then, only the first heat treatment was performed while the film was being transported through the tenter oven to heat and dry the gel film. As a result, a 12.5 μm-thick polyimide film was obtained. In the present Comparative Example, temperature $T_1$ in the first heat treatment was set at 250° C. and the second heat treatment was not conducted. The time for heating and drying the gel film in the first heat treatment was 20 seconds. The amount of residual volatile component and the removal efficiency of the residual volatile component at both edge portions in the film width direction of the obtained film were unable to be measured due to tears in the film. Operating conditions and the results are shown in Table 1. In Comparative Example 4, the temperature of the second heat treatment refers to the ambient temperature measured at the same spot where the temperature in the second heat treatment was measured in Example 1.

TABLE 1

| Examples | Drying time (sec) | First heat treatment temp (° C.) | Second heat treatment temp (° C.) | Second heat treatment air velocity (m/sec) | Amount of residual volatile component at both film edges (%) | Scratch on film | Tear in film | Removal efficiency of residual volatile component |
|---|---|---|---|---|---|---|---|---|
| Example 1 | 25 | 275 | 259 | 10 | 7.0 | ○ (none) | ○ (none) | 0.28 |
| Example 2 | 20 | 275 | 259 | 10 | 8.8 | ○ (none) | ○ (none) | 0.69 |
| Example 3 | 17 | 275 | 259 | 10 | 10.3 | ○ (none) | ○ (none) | 1.19 |
| Comp. Example 1 | 25 | 275 | 220 | — | 7.7 | ○ (none) | ○ (none) | −0.42 |
| Comp. Example 2 | 20 | 275 | 220 | — | 10.2 | ○ (none) | ○ (none) | −0.71 |
| Comp. Example 3 | 17 | 275 | 220 | — | 12.3 | ○ (none) | ○ (none) | −0.81 |
| Example 4 | 25 | 300 | 286 | 10 | 6.4 | ○ (none) | ○ (none) | 0.88 |
| Example 5 | 20 | 300 | 286 | 10 | 7.4 | ○ (none) | ○ (none) | 2.09 |
| Example 6 | 17 | 300 | 286 | 10 | 8.2 | ○ (none) | ○ (none) | 3.29 |
| Example 7 | 17 | 300 | 286 | 8 | 10.6 | ○ (none) | ○ (none) | 0.89 |
| Example 8 | 17 | 300 | 286 | 6 | 11.3 | ○ (none) | ○ (none) | 0.19 |
| Example 9 | 17 | 300 | 286 | 11 | 6.0 | X (scratched) | ○ (none) | 5.49 |
| Comp. Example 4 | 20 | 250 | 195 | — | — | ○ (none) | X (torn) | — |

As found in comparing Example 1 and Comparative Example 1, Example 2 and Comparative Example 2, and Example 3 and Comparative Example 3, the results shown in Table 1 indicate that when the heating and drying time and temperature $T_1$ (° C.) in a first heat treatment of step (3) are set to be the same, the amount of residual volatile component at both edge portions in the film width direction of a film is reduced by conducting a second heat treatment.

Moreover, as found in comparing Examples 1 and 4, Examples 2 and 5, and Examples 3 and 6, the results in Table 1 also show that when the heating and drying time and the air velocity in a second heat treatment of step (3) are set to be the same, the amount of residual volatile component at both edge portions in the film width direction of a film is reduced by increasing the temperature in a first heat treatment.

Yet furthermore, as found in comparing Example 6, Example 7 and Example 8, the results in Table 1 also show that when the heating and drying time and temperature $T_1$ (° C.) in a first heat treatment of step (3) are set to be the same, the amount of residual volatile component at both edge portions is reduced by appropriately setting the air velocity in a second heat treatment.

In addition, as found in comparing Example 6 and Example 9, when the air velocity in the second heat treatment exceeds a certain velocity, scratches on the film may occur.

Also, as found in comparing Comparative Example 4 and Comparative Example 2, the results in Table 1 show that when the heating and drying time and a second heat treatment of step (3) are set to be the same, tears in the film may occur if temperature $T_1$ (° C.) in a first heat treatment is lower than a certain temperature.

DESCRIPTION OF NUMERICAL REFERENCES

1 gel film
2 first heat treatment section 3 second heat treatment section
4 film running direction (direction MID)
5 film width direction (direction TD)
6 tenter pin
7 transport device cover
8 bracket

What is claimed is:

1. A process for producing a polymer film, the process comprising:
preparing a solution comprising a polymer, a precursor of the polymer, or a curing agent and the precursor of the polymer;
flow-casting the solution on a support body to mold the solution into a film;
heating the film such that a gel film is formed;
peeling the gel film from the support body: and
applying a heat treatment to the gel film while gripping the gel film at both edge portions in a film width direction,
wherein the heat treatment comprises a first heat treatment from a first heat treatment section that uniformly blows hot air in the width direction of the gel film and a second heat treatment from a second heat treatment section that continuously blows hot air to gripped edge portions in a direction parallel to a running direction of the gel film,
wherein the second heat treatment section is arranged between the first heat treatment section and the gel film; and wherein the first heat treatment is performed at a higher temperature than the second heat treatment.

2. The process of claim 1, wherein the first heat treatment is performed at a temperature $T_1$, and the second heat treatment is performed at a temperature $T_2$, and wherein $T_1$-$T_2$ is from 0.1° C. to 30° C.

3. The process of claim 2, wherein the first heat treatment is performed in the first heat treatment section positioned at a distance $D_1$ from the gel film, and the second heat treatment is performed in the second heat treatment section positioned at a distance $D_2$ from the gel film, and wherein a ratio of $D_2/D_1$ is 0.30 or less.

4. The process of claim 3, wherein the distance $D_2$ is from 3 mm to 100 mm.

5. The process of claim 2, wherein the polymer film is a polyimide film.

6. The process of claim 2, wherein the first and second heat treatments are performed simultaneously.

7. The process of claim 2, wherein the first heat treatment is performed before the second heat treatment.

8. The process of claim 2, wherein the temperature $T_1$ is from 200° C. to 600° C.

9. The process of claim 2, wherein the temperature $T_1$ is from 250° C. to 500° C.

10. The process of claim 1, wherein the first heat treatment is performed in the first heat treatment section positioned at a distance $D_1$ from the gel film, and the second heat treatment is performed in the second heat treatment section positioned at a distance $D_2$ from the gel film, and wherein a ratio of $D_2/D_1$ is 0.30 or less.

11. The process of claim 10, wherein the polymer film is a polyimide film.

12. The process of claim 10, wherein the first and second heat treatments are performed simultaneously.

13. The process of claim 10, wherein the first heat treatment is performed before the second heat treatment.

14. The process of claim 10, wherein the distance $D_2$ is from 3 mm to 100 mm.

15. The process of claim 10, wherein the distance $D_2$ is from 5 mm to 50 mm.

16. The process of claim 1, wherein the polymer film is a polyimide film.

17. The process of claim 16, wherein the first and second heat treatments are performed simultaneously.

18. The process of claim 16, wherein the first heat treatment is performed before the second heat treatment.

19. The process of claim 1, wherein the first and second heat treatments are performed simultaneously.

20. The process of claim 1, wherein the first heat treatment is performed before the second heat treatment.

* * * * *